(12) United States Patent
Desai et al.

(10) Patent No.: US 7,386,559 B1
(45) Date of Patent: Jun. 10, 2008

(54) FILE SYSTEM ENCAPSULATION

(75) Inventors: Samir Desai, Pune (IN); Aalop Shah, Pune (IN); Milind Borate, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 297 days.

(21) Appl. No.: 11/135,111

(22) Filed: May 23, 2005

(51) Int. Cl.
*G06F 7/00* (2006.01)
*G06F 17/00* (2006.01)

(52) U.S. Cl. .................... 707/101; 707/104.1; 707/200

(58) Field of Classification Search ............ 707/1–206; 712/28, 30; 717/162, 164
See application file for complete search history.

(56) References Cited

U.S. PATENT DOCUMENTS

| | | | |
|---|---|---|---|
| 6,892,211 B2* | 5/2005 | Hitz et al. ................... | 707/202 |
| 7,010,554 B2* | 3/2006 | Jiang et al. ................. | 707/205 |
| 2003/0195903 A1* | 10/2003 | Manley et al. .............. | 707/201 |
| 2004/0186858 A1* | 9/2004 | McGovern et al. ......... | 707/200 |
| 2004/0236798 A1* | 11/2004 | Srinivasan et al. ......... | 707/200 |
| 2004/0254907 A1* | 12/2004 | Crow et al. ..................... | 707/1 |
| 2005/0010620 A1* | 1/2005 | Silvers et al. ............... | 707/205 |
| 2005/0065986 A1* | 3/2005 | Bixby et al. ................. | 707/204 |
| 2006/0010177 A1* | 1/2006 | Kodama ...................... | 707/204 |

OTHER PUBLICATIONS

Yi, Ke, et al. "Incremental Maintenance of XML Structural Indexes," Proceedings of the ACM SIGMOD International Conference on Management of Data. Paris, France, Jun. 13-18, 2004, p. 491-502.*

* cited by examiner

*Primary Examiner*—Jean M Corrielus
*Assistant Examiner*—Angelica Ruiz
(74) *Attorney, Agent, or Firm*—Campbell Stephensen LLP; Jonathan N. Geld

(57) ABSTRACT

A method, system, and apparatus to encapsulate one or more file systems in a union of file systems without modifying or copying information in each file directory entry in each file system are presented. In one embodiment, this is accomplished in part by linking an inode list file from the file system to be encapsulated with an inode list file of the union of file systems, and merging a free extent map of the to-be-encapsulated file system with the free extent map file of the union file system.

22 Claims, 5 Drawing Sheets

FILE SYSTEM ENCAPSULATION

FIELD OF THE INVENTION

The present invention relates to data storage in a network or stand-alone computing environment, and particularly to systems and methods for enabling the encapsulation of one or more file systems into a union of file systems without modifying all the user data and most of the metadata in the one or more file systems.

BACKGROUND OF THE INVENTION

The ever-increasing reliance on information and the computing systems that produce, process, distribute, and maintain such information in its myriad forms continues to put great demands on techniques for data storage and data protection. As demands and expectations from an information network change over the lifetime of the information network, initial decisions made with regard to where and how data is stored in the information network may need to be altered. Modifying file systems in an information network can implicate not only a change of storage resources, but also personnel resources to implement such changes.

For example, should a storage administrator determine that information stored in multiple file systems would be more effectively accessed in a single file system, implementing such a modification could take many hours of equipment and personnel time. Such a modification could be implemented by backing up the file systems to be united, clearing storage objects storing the data of those file systems, uniting all the storage objects into a single set of volumes, and then restoring all the data of the various file systems onto the single set of volumes of storage objects.

Alternatively, a storage administrator could choose to provide various file systems through directory structure access points that disguise the distinction between the separate file systems. A disadvantage of such a system can be that free memory, or extent, space between the various file systems is not shared among the file systems, thereby potentially resulting in an inefficient distribution of resources.

It is therefore desirable to have a low cost method of encapsulating one or more file systems into a union of file systems. Low cost can be realized by having a method that does not involve a lengthy and resource intensive backup/restore. In other words, a method in which each directory entry for each file in a file system does not need to be modified or copied. Further, it is desired that such a method of encapsulating file systems results in the free space for each encapsulated file system being useable by all file systems in the union of file systems.

SUMMARY OF THE INVENTION

The present invention presents a method, system, and apparatus that encapsulate one or more file systems in a union of file systems without modifying or copying information in each file directory entry in each file system (e.g., block map trees of inodes are not modified and therefore inodes and indirect extents are not modified). In one embodiment, this is accomplished in part by providing a means for linking an inode list file from the file system to be encapsulated with an inode list file of the union of file systems, and a means for merging a free extent map of the to-be-encapsulated file system with the free extent map file of the union file system.

In aspects of the above embodiment, linking the inode list file from the file system to be encapsulated with the inode list file of the union of file systems can involve creating an inode reference in the union file system corresponding to a location of the encapsulated inode list file or copying the encapsulated inode list file to the union file system. In another aspect of the above embodiment, structural files describing the encapsulated file system can be merged with structural files describing the union file system.

In another aspect of the above embodiment, the encapsulated file system is associated with a fileset. A directory entry located in the union file system but referencing data stored in the encapsulated file system's fileset includes a fileset identifier corresponding to the fileset and an inode value corresponding to the location of the data in the fileset. Such a directory entry can be created by renaming a directory entry stored in the encapsulated file system's fileset.

In a further aspect of the above embodiment, a second file system can be encapsulated in the union of file systems. A directory entry can be created in the first encapsulated fileset referencing data stored in a fileset associated with the second file system by including a fileset identifier referencing the second file system's fileset, and flagging that directory entry to indicate that the format of the directory entry includes the fileset identifier. Such flagging can include providing a pointer to a reserved inode in the first encapsulated fileset.

In another aspect of the above embodiment, an extent can be allocated from the set of free extents of an encapsulated file system to a file whose initial data is stored in the union file system.

The foregoing is a summary and thus contains, by necessity, simplifications, generalizations and omissions of detail; consequently those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

DETAILED DESCRIPTION

Figure 1:
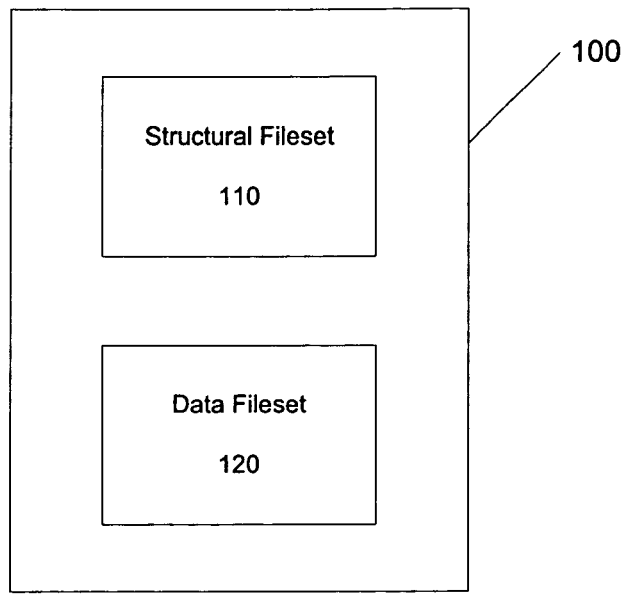
FIG. 1 is a simplified block diagram of a file system.

The present invention provides a method for encapsulating one or more file systems into a union file system by linking and merging certain structural information describing the encapsulated file systems with corresponding information of the union file system. Specifically, a mechanism for pointing to or copying the inode list information describing the encapsulated file systems is provided. Further, a mechanism for merging a description of the available free space of each encapsulated file system to that of the union file system is also provided. Additional structural information of the encapsulated file systems can be linked and merged to the corresponding information in the union file system so that the union file system functions as a normal file system. A multi-volume file system can thus be created or expanded through this uniting of initially separate file systems.

File System Structure

A file system is a data structure or a collection of files. A "file system" can refer to two distinct things: a directory tree or an arrangement of files on a storage object. The latter has a tangible physical location and can be thought of as a physical file system, while the former is a logical structure and can be thought of as a logical file system. The physical file system can be stored on a portion of one or more storage objects. The portion of the one or more storage objects can be, for example, a partition of a volume, or a collection of space on one or more volumes such as an AdvFS domain or a VERITAS File System allocation unit. Allocated storage object size determines the amount of memory space that the file system can use. Storage object memory space is typically divided into a set of uniformly-sized blocks that are allocated to store information in the file system. File systems typically have a superblock, inodes and data blocks.

A superblock stores some information about a file system. Depending on the file system structure, such information can include size and status of the file system, a label (file system name and storage object name), size of the file system logical block, date and time of the last update to the file system, summary data block, file system state, and a path name of a last mount point of the file system. A superblock can also include references to the locations of additional file system structural files, such as a structural fileset. A superblock contains critical data related to the file system without which the file system could not be accessed, and therefore redundant superblocks are often made when a file system is created.

File systems can use a fileset to store additional file structural information. Such a structural fileset can contain an inode list file, a free extent map file, a fileset header file, a quota file, and an object location table file pointing to other structural files. Such a file system can also store user data in one or more additional filesets and will include inode lists of the files in that fileset.

Information about each file in a file system can be kept in a structure called an inode (or an AdvFS tag). An inode contains pointers to data blocks of one or more storage objects containing data associated with a file, as well as other information such as the type of file, file permission bits, owner information, file size, file modification time, etc. This additional information is often referred to as metadata. An inode can also contain pointers to indirect address blocks, which are blocks containing pointers to data blocks, usually implemented in files with many extents or blocks. Pointers in an inode point to data blocks or extents on the storage object in file system memory space. A list of inodes in the file system is maintained, either in a superblock or an inode list file within the structural fileset.

Data blocks or extents embody the remaining space allocated to a file system. The size of a data block is determined when a file system is created, while extents are variable in size. For a data file, data blocks or extents contain the contents of the file. For a directory, data blocks contain entries that give inode numbers and file names of files in the directory. Blocks or extents that are not currently being used as inodes, indirect address blocks, or as data blocks, can be marked as free in the file system's free extent map file.

As stated above, a file system can be structured using a directory hierarchy. Such a directory hierarchy is a logical structure that provides pointers to where data is actually stored on a storage object. The directory structure is traversed to determine the initial inode where the file data is located. For example, if one wishes to access file data in "/usr/Jones/a", such information is found by first going to the root directory of the file system. A file system structural file contains information as to the inode where the root (in UNIX called "/") directory is located. The root directory file is read in order to find the inode of the directory "usr". The directory file at that inode is then read to determine the inode of the "Jones" directory, then the directory file at that inode is read to determine the inode of data file "a". At that point, an application can access the data in file "a" by starting at the initial inode indicated in the "Jones" directory file. If all the information in file "a" is not contiguous, a pointer is provided to the next inode at which data corresponding to file "a" is located. In this manner, lookups in directory hierarchy can be performed to read any data stored in the file system.

Network elements can access multiple file systems through an access point for each file system. When reference is made to the access point for a particular file system, the network element operating system then accesses the root directory of that file system. The network element can then traverse the directory hierarchy of the particular file system as explained above.

Once a file system is created, it is difficult to combine that file system with another file system. Such difficulty is due, in part, to each file system having its own set of inodes describing the location of files referenced by that file system's directory hierarchy. Inode numbers are not necessarily unique to a particular file system, and any overlap between combined file systems will cause lookup confusion. As stated above, in order to avoid lookup confusion, a file system to be included in another file system can be backed up and then restored to the target file system. Such a backup and restore operation creates a new set of directory entries in the target file system that use the target file system's inode list, thereby eliminating lookup confusion. Such a backup and restore operation can be time consuming and intensive in terms of system and personnel resources.

Encapsulating File Systems

Confusion due to common inode numbers being used in the various file systems is a barrier to combining file systems. This occurs because a file system data fileset has a list of inode numbers that are referenced in a one-dimensional fashion via the directory hierarchy. There is no way to distinguish within the directory hierarchy an inode number from one data fileset to another data fileset. The present invention proposes a two-dimensional directory lookup structure for encapsulated filesets, wherein not only an inode of a target file is provided, but also a fileset identifier, thereby distinguishing between various filesets in a union of file systems. Such a two-dimensional structure will permit encapsulating file system filesets without modifying each directory entry in a fileset.

FIG. 1 is a simplified block diagram of one example of a file system 100. File system 100 comprises two filesets: a structural fileset 110 and a data fileset 120. Structural fileset 110 can contain such file system structural files as a free extent map file containing the free extent maps for allocation units or domains, as well as a fileset header file describing locations of inode list files for filesets 110 and 120, log files, and user quota files. Data fileset 120 contains user data as well as an inode list file describing the locations of the user data. Other file system embodiments can have no filesets, instead having all structural and data information in a single storage area in the storage object.

Figure 2:
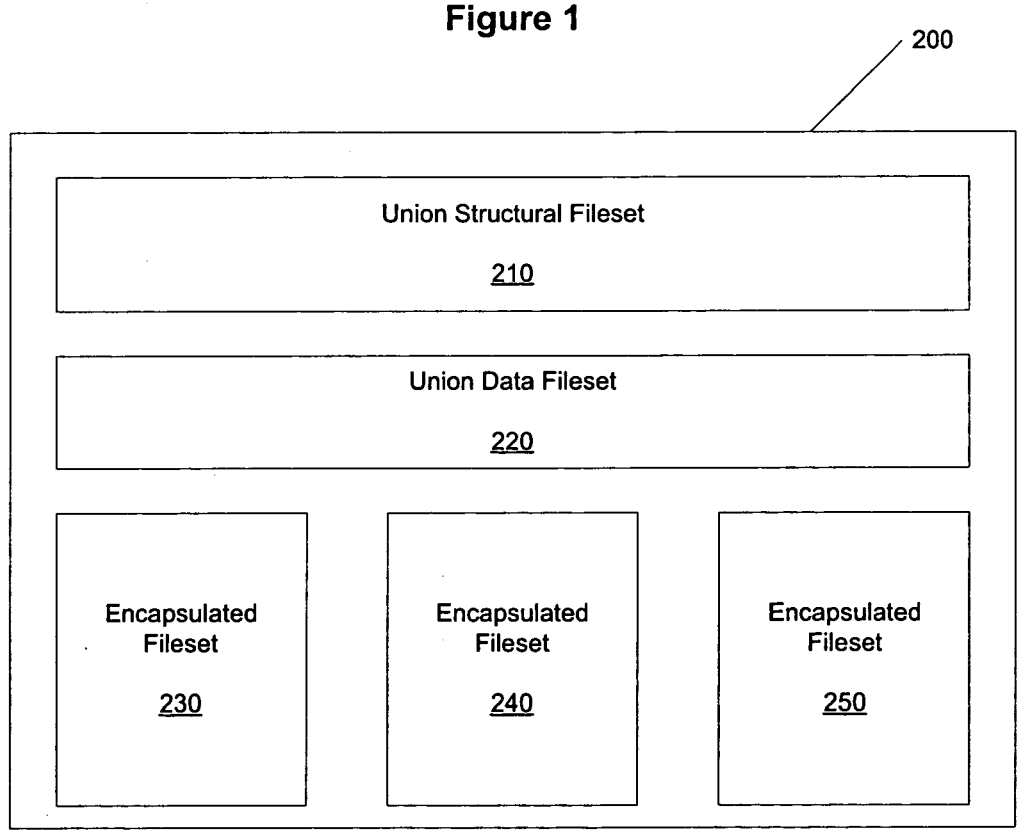
FIG. 2 is a simplified block diagram illustrating a union of file systems assembled in accord with one embodiment of the present invention.

FIG. 2 is a simplified block diagram illustrating a union of file systems as implemented by one embodiment of the present invention. A union file system 200 comprises a structural fileset 210 and a data fileset 220. As with file system 100, structural fileset 210 includes structural information about union file system 200, including a free extent map and an inode list file. Similarly, data fileset 220 contains user data for union file system 200. Union file system 200 further includes encapsulated filesets 230, 240, and 250 that can include data and structural information of file systems encapsulated in union file system 200. Each of encapsulated filesets 230, 240, and 250 can contain an inode list describing locations of data within the encapsulated filesets. The inode lists for each of the encapsulated filesets are linked to the inode list in structural fileset 210. In one embodiment of the present invention, such a link can take the form of an inode reference in the structural fileset 210 of file system 200 that corresponds to the location of the inode list within each of the encapsulated filesets 230, 240, and 250. In an alternate embodiment, each of the inode lists of the encapsulated filesets can be concatenated to the inode list for file system 200, while maintaining their starting offset in the structural fileset 210. Thus the inode list of file system 200 is, logically a two-dimensional structure, an array of inode lists. Such a linkage permits looking up of files located within any data fileset that is a member of file system 200.

In order to identify whether a file is located in fileset 220, 230, 240, or 250, directory entries in union file system 200 identify not only a file's inode but also the fileset wherein the file may be found. Directory hierarchy lookups within union file system 200 are two-dimensional, using a fileset identifier as well as an inode. By combining file systems through this method of fileset identifier and inode lookup, a low-cost solution for encapsulating file systems may be had. No resource-costly backup and restore operation need be performed. Further, each directory entry within encapsulated filesets 230, 240, and 250 need not be modified to provide a unique lookup for inodes within those filesets.

Additional structural information can be merged from the various encapsulated file systems and union file system 200. As stated above, it can be desirable for the union file system 200 to have access to the extent maps of each encapsulated file system, thereby providing a means for efficient distribution of available storage resources. Such access can be provided by merging the free extent maps of each encapsulated file system with a free extent map of the union file system 200. Such a merger can be accomplished by copying information from the free extent maps of the encapsulated file systems to union structural fileset 210 and creating a single free extent map that references the storage volumes associated with the encapsulated file systems and the union file system. Alternatively, the merger can be accomplished by providing pointers from union structural fileset 210 to the free extent maps stored in the encapsulated file systems. Other structural files from the various encapsulated file systems may also be merged with corresponding files of union file system 200 by copying information from those files to structural fileset 210 or providing pointers from structural fileset 210 to the encapsulated file systems' structural files.

Figure 3:
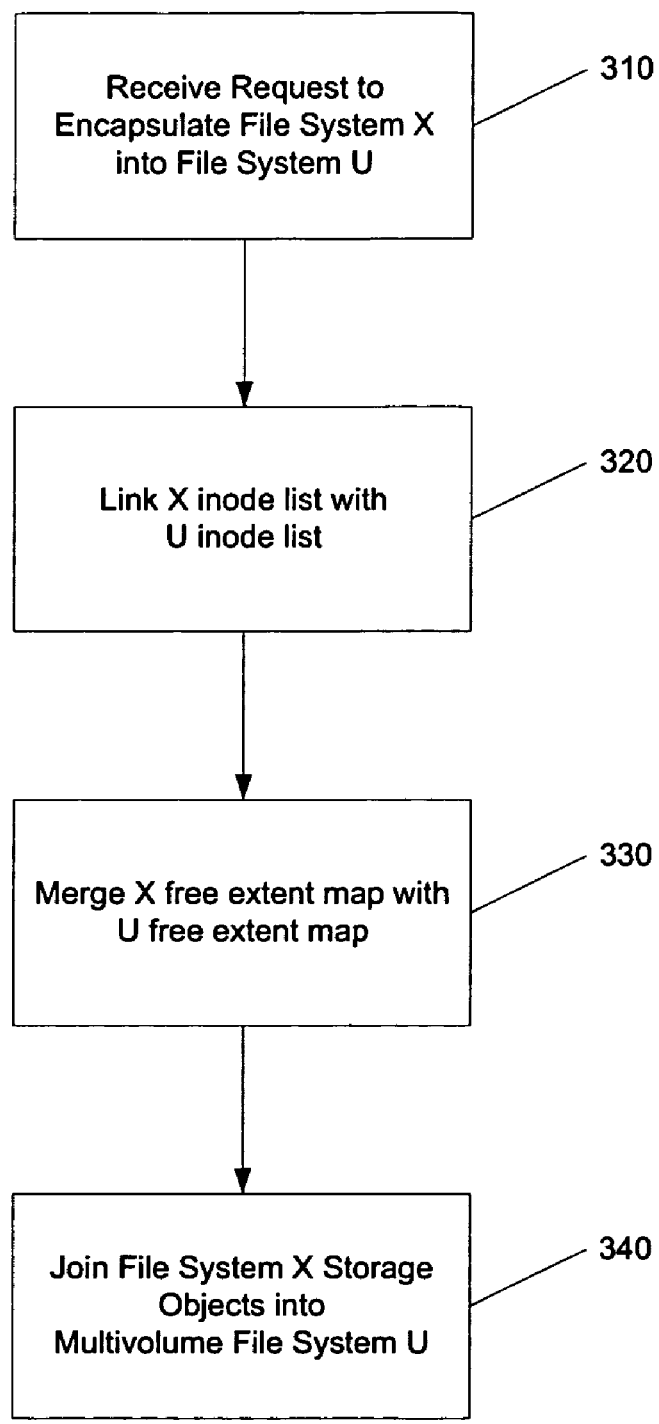
FIG. 3 is a simplified flow diagram illustrating steps taken to encapsulate a file system into a union file system according to one embodiment of the present invention.

FIG. 3 is a simplified flow diagram illustrating steps taken to encapsulate a file system into a union file system according to one embodiment of the present invention. A request can be received to encapsulate a file system X into a union file system U (310). The location of an inode list for a data fileset of file system X is determined and that inode list is linked to the inode list of the union file system (320). As stated above, such linkage can include an inode reference (including fileset identifier) in the structural fileset for file system U corresponding to the location of the inode list for the data fileset X, or concatenating the inode list for the data fileset X onto the inode list for fileset U. In order to provide file system U with access to the free extents in file system X, the free extent map for file system X is merged with that of the free extent map for file system U (330). Such a merger can be accomplished by copying the information from the free extent map for file system X into that of file system U. Storage objects of file system X can then be joined to form a multi-volume file system U (340). Such a joining can include the merging of other structural files from file system X into those of file system U.

Union file system 200 has directory entries that contain not only an inode number but also a fileset identifier. But since directory entries originally stored in encapsulated filesets 230, 240, and 250 are not modified during the encapsulation process, those directory entries only include an inode number. Therefore, a mechanism is required for distinguishing between old format (inode number only) and new format (inode number plus fileset identifier) directory entries. Since the identity of the encapsulated filesets remains even after encapsulation, a default rule can be applied for directory entries within an encapsulated fileset. That is, a directory entry within an encapsulated file system can be assumed to have just an inode number pointing to an inode within that encapsulated file system. Such a default rule thereby addresses both directory entries preexisting within an encapsulated fileset and directory entries created in an encapsulated fileset after encapsulation that refer to inodes within that encapsulated fileset.

Should a directory entry need to be created in an encapsulated file system that refers to a file or inode either in union fileset 220 or to another encapsulated file system, then a new format directory entry will be needed; that is a directory entry that references both a fileset identifier and an inode number. Since the default rule for directory entries within an encapsulated file system is the old format, or inode only, a mechanism is provided to distinguish a new format directory entry from an old format directory entry. In one embodiment of the present invention, such identification is provided by reserving a free inode in the encapsulated file system at the time of encapsulation (e.g., reserved by referencing the free inode map of the encapsulated file system). A new-format directory entry can be flagged as such by referencing the reserved inode. Therefore, when performing a directory lookup, if the reserved inode is detected the file system will identify the directory entry as a new format directory entry and therefore will interpret the fileset identifier when performing a directory lookup.

Figure 4:
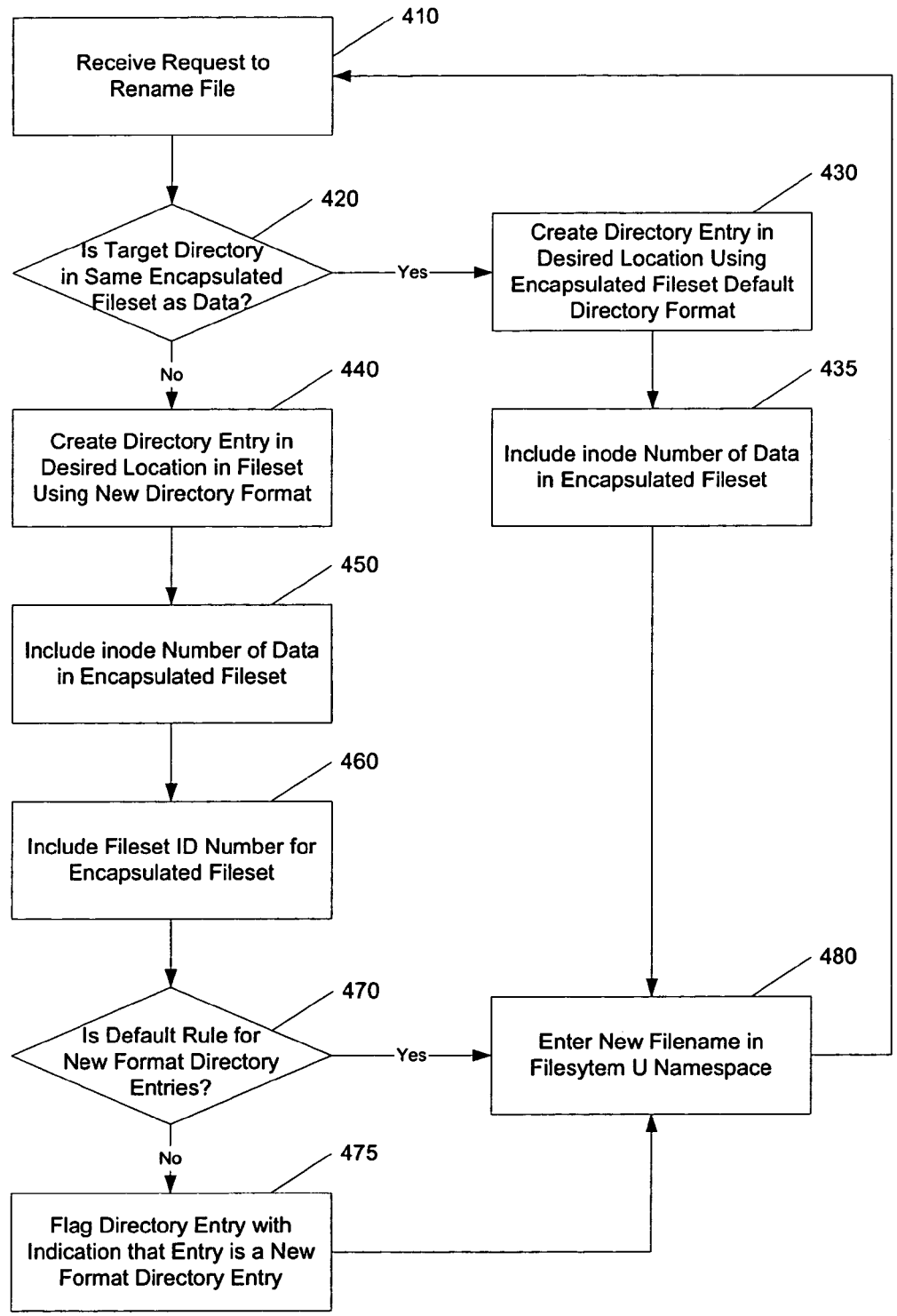
FIG. 4 is a simplified flowchart illustrating a method for renaming a file according to one embodiment of the present invention.

FIG. 4 is a simplified flowchart illustrating a method for renaming a file according to one embodiment of the present invention. Such a rename operation illustrates one implementation of the new/old directory format identification. A request to rename the file can be received (410). A determination is made as to whether the target directory for the renamed file is within the same encapsulated fileset where the data is currently associated (420). If the target directory is within the same encapsulated fileset, then the new directory entry is created in the desired location using a default directory format for the encapsulated fileset (430). The inode number of the data is included in the new directory entry as with a standard rename operation (435). The new file name can then be entered in the name space for the union file system (480).

If the target directory is not to be located in the same encapsulated fileset as the data, then the new directory entry can be created in the desired location of the union file system, including any encapsulated fileset directory, using the new directory format (440). The inode number of the data location in the encapsulated fileset is included in the new directory entry (450). The fileset identifier of the data source encapsulated fileset is also included in the new directory entry (460). If the default rule of the target directory fileset is for new format directory entries (470), then the filename can be entered in the union file system name space (480). If the default rule of the target directory fileset is not for new format directory entries, then the new directory entry can be flagged with an indication that this is a new format directory entry (475). As stated above, this can be performed by referencing a reserved inode in the encapsulated file system. In one embodiment, such referencing can be performed by including space for both the reserved inode and the inode number of the data location in the encapsulated fileset in the new directory entry format. Once the target directory has been so flagged, the new directory entry can be entered into the union file system name space. In this manner, the existing directory entry format of the encapsulated file system is extended for use within file systems of the present invention.

It can be readily seen that rename operations are not the only operations implicated by the present invention. Other operations that do not ordinarily require the copying of data from one location to another can also utilize and benefit from the mechanisms provided by the present invention. For example, block map trees of inodes in encapsulated file systems (including pointers to data extents, indirect extents, etc.) will not be modified during encapsulation, and therefore will not include device identifiers where the encapsulated file system is not a multi-device file system. If the block map entry does not specify a device entry, then a default rule can be set that such entries refer to the default device of the encapsulated fileset. Once encapsulated, a technique of old format/new format with a block map flag can be implemented to allow for the creation of extents on other storage volumes in the union file system.

As shown above, the present invention can be implemented using a variety of computer systems and networks. An example of one such computing and network environment is described below with reference to FIGS. 5 and 6.

An Example Computing and Network Environment

As shown above, the present invention can be implemented using a variety of computer systems and networks. An example of one such computing and network environment is described below with reference to FIGS. 5 and 6.

Figure 5:
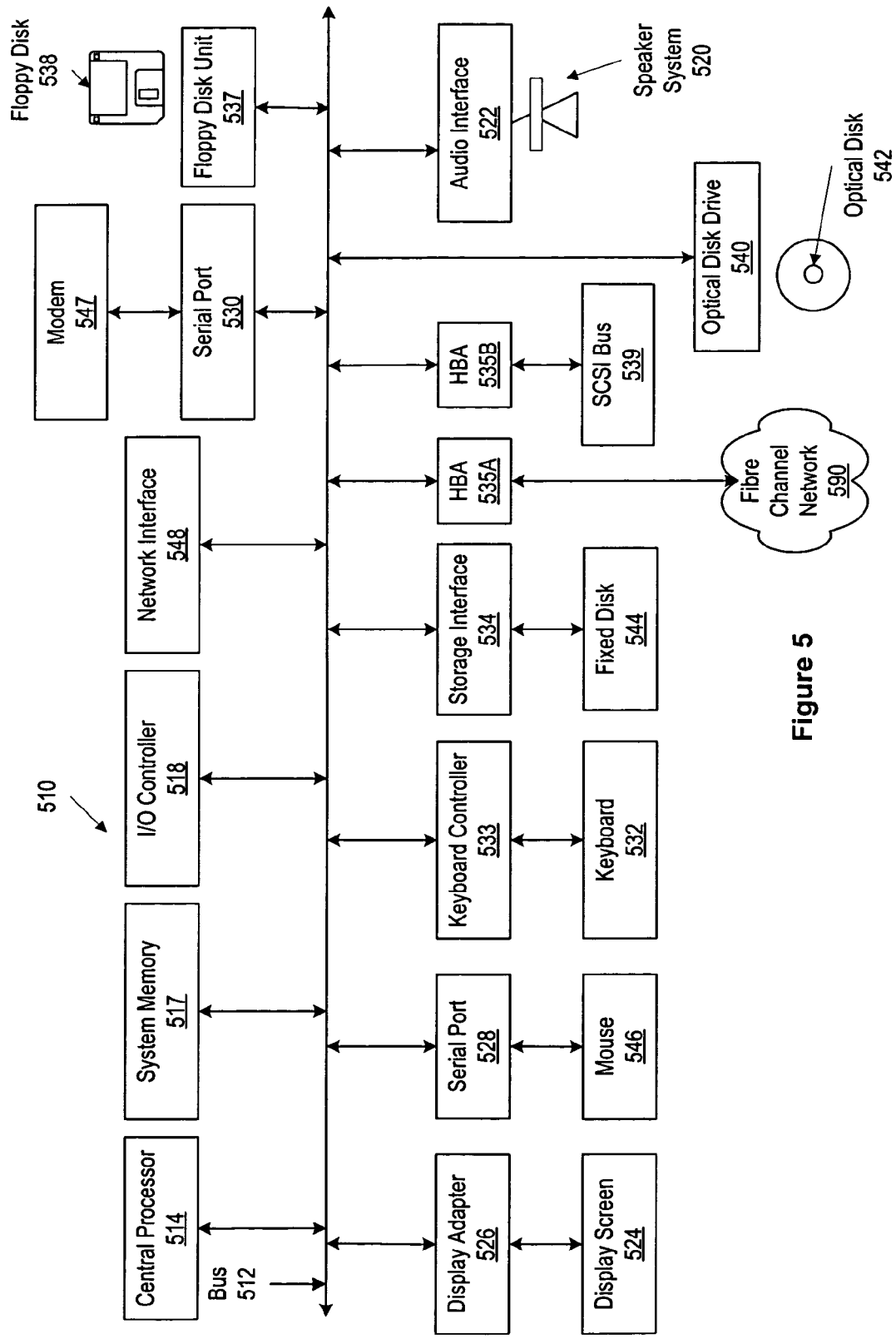
FIG. 5 is a simplified block diagram illustrating a computer system suitable for implementing embodiments of the present invention.

FIG. 5 depicts a block diagram of a computer system 510 suitable for implementing the present invention. Computer system 510 includes a bus 512 which interconnects major subsystems of computer system 510, such as a central processor 514, a system memory 517 (typically RAM, but which may also include ROM, flash RAM, or the like), an input/output controller 518, an external audio device, such as a speaker system 520 via an audio output interface 522, an external device, such as a display screen 524 via display adapter 526, serial ports 528 and 530, a keyboard 532 (interfaced with a keyboard controller 533), a storage interface 534, a floppy disk drive 537 operative to receive a floppy disk 538, a host bus adapter (HBA) interface card 535A operative to connect with a fibre channel network 590, a host bus adapter (HBA) interface card 535B operative to connect to a SCSI bus 539, and an optical disk drive 540 operative to receive an optical disk 542. Also included are a mouse 546 (or other point-and-click device, coupled to bus 512 via serial port 528), a modem 547 (coupled to bus 512 via serial port 530), and a network interface 548 (coupled directly to bus 512).

Bus 512 allows data communication between central processor 514 and system memory 517, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 510 are generally stored on and accessed via a computer readable medium, such as a hard disk drive (e.g., fixed disk 544), an optical drive (e.g., optical drive 540), a floppy disk unit 537, or other storage medium.

Storage interface 534, as with the other storage interfaces of computer system 510, can connect to a standard computer readable medium for storage and/or retrieval of information, such as a fixed disk drive 544. Fixed disk drive 544 may be a part of computer system 510 or may be separate and accessed through other interface systems. Modem 547 may provide a direct connection to a remote server via a telephone link or to the Internet via an Internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, all of the devices shown in FIG. 5 need not be present to practice the present invention. The devices and subsystems can be interconnected in different ways from that shown in FIG. 5. The operation of a computer system such as that shown in FIG. 5 is readily known in the art and is not discussed in detail in this application. Code to implement the present invention can be stored in computer-readable storage media such as one or more of system memory 517, fixed disk 544, optical disk 542, or floppy disk 538. Additionally, computer system 510 can be any kind of computing device using an operating system that provides necessary data access features and capabilities.

Figure 6:
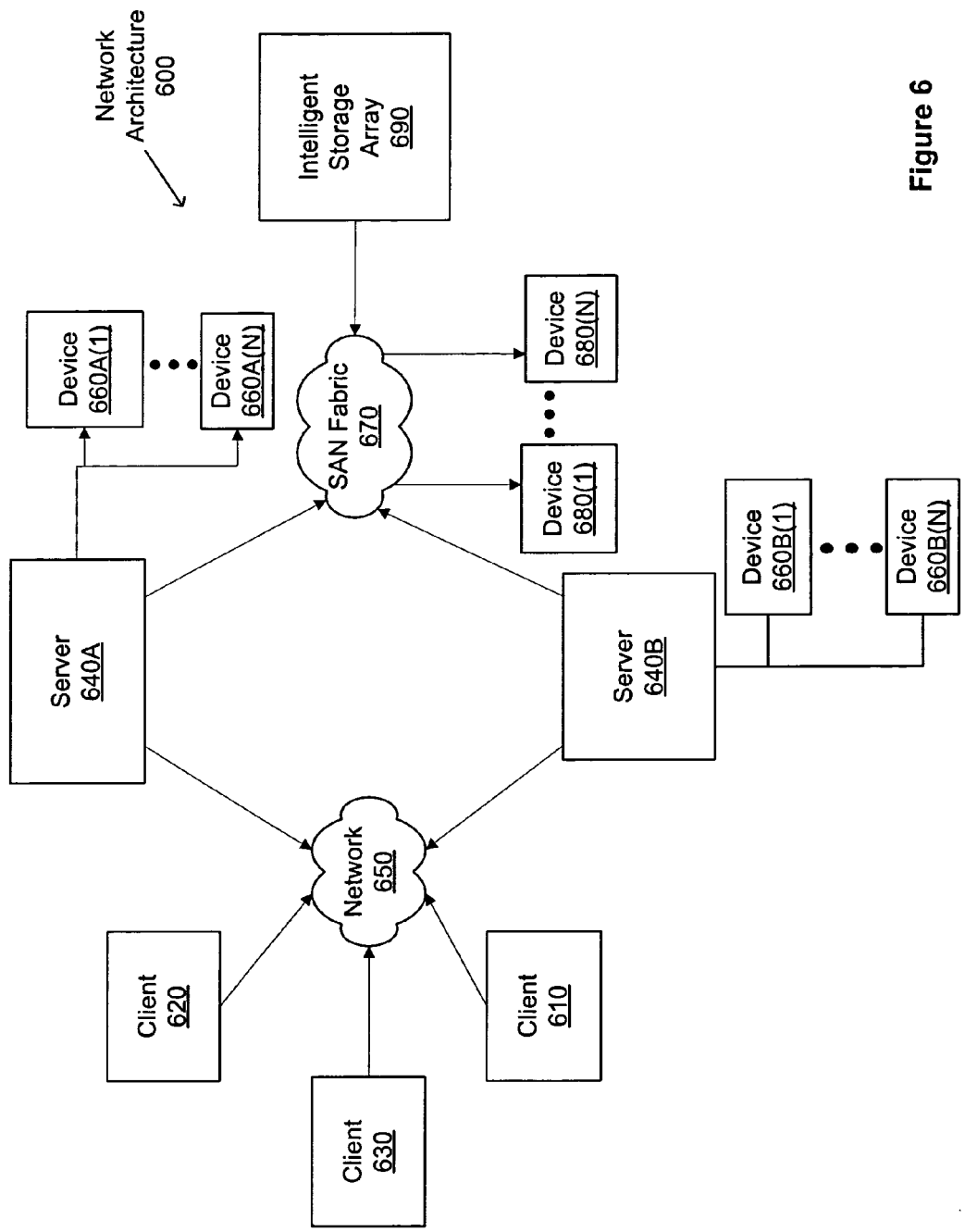
FIG. 6 is a simplified block diagram illustrating a network architecture suitable for implementing embodiments of the present invention.

FIG. 6 is a block diagram depicting a network architecture 600 in which client systems 610, 620 and 630, as well as storage servers 640A and 640B (any of which can be implemented using computer system 510), are coupled to a network 650. Storage server 640A is further depicted as having storage devices 660A(1)-(N) directly attached, and storage server 640B is depicted with storage devices 660B (1)-(N) directly attached. Storage servers 640A and 640B are also connected to a SAN fabric 670, although connection to a storage area network is not required for operation of the invention. SAN fabric 670 supports access to storage devices 680(1)-(N) by storage servers 640A and 640B, and so by client systems 610, 620 and 630 via network 650. Intelligent storage array 690 is also shown as an example of a specific storage device accessible via SAN fabric 670.

With reference to computer system 510, modem 547, network interface 548 or some other method can be used to provide connectivity from each of client computer systems 610, 620 and 630 to network 650. Client systems 610, 620 and 630 are able to access information on storage server 640A or 640B using, for example, a web browser or other client software (not shown). Such a client allows client systems 610, 620 and 630 to access data hosted by storage server 640A or 640B or one of storage devices 660A(1)-(N), 660B(1) (N), 680(1)-(N) or intelligent storage array 690. FIG. 6 depicts the use of a TCP/IP network for exchanging data, but the present invention is not limited to any particular network-based environment.

OTHER EMBODIMENTS

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

The foregoing describes embodiments including components contained within other components (e.g., the various elements shown as components of computer system 510). Such architectures are merely examples, and, in fact, many other architectures can be implemented which achieve the same functionality. In an abstract but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

The foregoing detailed description has set forth various embodiments of the present invention via the use of block diagrams, flowcharts, and examples. It will be understood by those within the art that each block diagram component, flowchart step, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing media include recordable media such as floppy disks and CD-ROM, transmission type media such as digital and analog communications links, as well as media storage and distribution systems developed in the future.

The above-discussed embodiments can be implemented by software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention can also include a semiconductor-based memory, which may be permanently, removably or remotely coupled to a microprocessor/memory system. Thus, the modules can be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
    linking a first inode list to a union inode list, wherein
        a first file system comprises the first inode list,
        a union file system comprises the union inode list, the union inode list comprises inodes for the union file system, and
        said linking permits access to files in the first file system by referencing the union inode list;
    merging a first free extent map with a union free extent map, wherein
        the first file system further comprises the first free extent map, and
        the union file system faker comprises the union free extent map; and
    storing the union inode list and the union free extent map in a storage object associated with the union file system.

2. The method of claim 1 wherein said linking comprises:
    creating an inode reference in the union file system corresponding to a location of the first inode list in the first file system.

3. The method of claim 1 wherein said linking comprises:
    copying the first inode list to the union file system.

4. The method of claim 3 wherein said copying comprises:
    concatenating the first inode list onto the union inode list; and maintaining a starting offset of the first inode list as concatenated onto the union inode list in the union file system.

5. The method of claim 1 further comprising;
merging a first set of structural files describing the first file system with a union set of structural files describing the union file system, wherein
the first set of structural files includes one or more of a fileset header file, an inode allocation unit file, an extent allocation unit summary file, and a quotas file.

6. The method of claim 1 further comprising:
storing a first directory entry in the union file system corresponding to data associated with the first file system, wherein
the first file system is associated with a first fileset, and
the first directory entry includes
a first fileset identifier corresponding to the first fileset, and
a first inode value corresponding to a location of the data stored in the first fileset.

7. The method of claim 6 further comprising:
renaming a second directory entry to create the first directory entry, wherein
the second directory entry is stored in the first fileset, and
the second directory entry includes the first inode value corresponding to the location of the data stored in the first fileset.

8. The method of claim 6 further comprising:
creating a third directory entry in the first fileset, wherein
the third directory entry includes a third fileset identifier; and
flagging the third directory entry, wherein
said flagging indicates that the third directory entry includes the third fileset identifier.

9. The method of claim 8 wherein said flagging comprises:
providing a pointer to a first reserved inode in the first fileset.

10. The method of claim 8, wherein
the third directory entry corresponds to data referenced by a second fileset, wherein
the third fileset identifier corresponds to the second fileset.

11. The method of claim 1 further comprising:
allocating an extent from a set of free extents associated with the first file system, wherein
the set of free extents is designated in the union free extent map; and
using the allocated extent to store data for a file whose initial extents are stored in the union file system.

12. The method of claim 1 further comprising:
allocating an extent from a set of free extents associated with the union file system, wherein
the set of free extents is designated in the union free extent map;
using the allocated extent to store data for a file whose initial extents are stored in the first file system;
identifying the allocated extent with an extent identifier that comprises
a fileset identifier corresponding to the fileset in which the allocated extent is located; and
flagging the extent identifier, wherein
said flagging indicates that the extent identifier comprises the fileset identifier.

13. A computer-readable storage medium comprising:
a first set of instructions, executable on a computer system, configured to link a first inode list to a union inode list, wherein
a first file system comprises the first inode list,
a union file system comprises the union inode list, the union inode list comprises inodes for the union file system, and
said link permits access to files in the first file system by referencing the union inode list;
a second set of instructions, executable on the computer system, configured to merge a first free extent map with a union free extent map, wherein the first file system further comprises the first free extent map, and the union file system further comprises the union free extent map, and
a third set of instructions, executable on the computer system, configured to store the union inode list and the union free extent map in a storage object associated with the union file system.

14. The computer-readable storage medium of claim 13 further comprising:
a fourth set of instructions, executable on the computer system, configured to store a first directory entry in the union file system corresponding to data referenced by a first fileset, wherein
the first file system further comprises the first fileset, and
the first directory entry includes
a first fileset identifier corresponding to the first fileset, and
a first inode value corresponding to a location of the data stored in the first fileset.

15. The computer-readable storage medium of claim 14 further comprising:
a fifth set of instructions, executable on the computer system, configured to rename a second directory entry to create the first directory entry, wherein
the second directory entry is stored in the first fileset, and
the second directory entry includes the first inode value corresponding to the location of the data stored in the first fileset.

16. The computer-readable storage medium of claim 14 further comprising:
a fifth set of instructions, executable on the computer system, configured to create a third directory entry in the first fileset, wherein
the third directory entry includes a third fileset identifier; and
a sixth set of instructions, executable on the computer system, configured to flag the third directory entry, wherein
said flag indicates that the third directory entry comprises the third fileset identifier.

17. The computer-readable storage medium of claim 13 further comprising:
a fourth set of instructions, executable on the computer system, configured to allocate an extent from a set of free extents associated with the first file system, wherein
the set of free extents is designated in the union free extent map; and
a fifth set of instructions, executable on the computer system, configured to use the allocated extent to store data for a file whose initial extents are stored in the union file system.

18. An apparatus comprising:
a processor;
a memory coupled to the processor and comprising one or more storage objects;
a first file system comprising a first inode list and a first free extent map, wherein the first file system is stored on a first set of storage objects of the one or more storage objects;
a union file system comprising a union inode list and a union free extent map, wherein
the union file system is stored on a second set of storage objects of the one or more storage objects, and
the union inode list comprises inodes for the union file system;
means for linking the first inode list to the union inode list, wherein said linking permits access to files in the first file system by referencing the union inode list; and
means for merging the first free extent map with the union free extent map.

19. The apparatus of claim 18 further comprising:
the first file system further comprises a first fileset, wherein
the first fileset comprises data stored in the first fileset;
means for storing in the union file system a first directory entry corresponding to the data stored in the first fileset, wherein
the first directory entry includes
a first fileset identifier corresponding to the first fileset, and
a first inode value corresponding to a location of the data stored in the first fileset.

20. The apparatus of claim 19 further comprising:
a second file system comprising a second fileset;
means for creating a second directory entry in the first fileset, wherein
the second directory entry includes a second fileset identifier; and
means for flagging the second directory entry, wherein said flagging indicates that the second directory entry includes the second fileset identifier.

21. A system comprising:
a first storage object comprising a first file system, wherein
the first file system comprises a first inode list and a first free extent map;
a second storage object comprising a union file system, wherein
the union file system comprises a union inode list and a union free extent map, and
the union inode list comprises inodes for the union file system; and
a processor coupled to the first and second storage objects and configured to
link the first inode list to the union inode list and
merge the first free extent map with the union free extent map, wherein
said link permits access to files in the first file system by referencing the union inode list.

22. The system of claim 21, wherein:
the first file system further comprises a first fileset, wherein
the first fileset comprises data stored in the first fileset; and
the processor is further configured to
store a first directory entry in the union file system corresponding to the data stored in the first fileset, wherein
the first directory entry includes
a first fileset identifier corresponding to the first fileset, and
a first inode value corresponding to a location of the data stored in the fit fileset.

* * * * *